US011255739B2

(12) United States Patent
Schumacher et al.

(10) Patent No.: US 11,255,739 B2
(45) Date of Patent: Feb. 22, 2022

(54) METHOD AND SYSTEM FOR COMPONENT WEAR MONITORING

(71) Applicant: REI, Inc., Salt Lake City, UT (US)

(72) Inventors: Alex Schumacher, Salt Lake City, UT (US); Daniel J. Brunner, Salt Lake City, UT (US); Jeffrey J. Schwoebel, Park City, UT (US); Randy Richardson, South Jordan, UT (US); Robert Koontz, Herriman, UT (US); Randall Johnson, Salt Lake City, UT (US)

(73) Assignee: REI, INC., Salt Lake City, UT (US)

(*) Notice: Subject to any disclaimer, the term of this patent is extended or adjusted under 35 U.S.C. 154(b) by 0 days.

(21) Appl. No.: 16/944,592

(22) Filed: Jul. 31, 2020

(65) Prior Publication Data

US 2020/0363278 A1 Nov. 19, 2020

Related U.S. Application Data

(63) Continuation of application No. 15/967,932, filed on May 1, 2018, now Pat. No. 10,768,062.

(60) Provisional application No. 62/492,361, filed on May 1, 2017.

(51) Int. Cl.
| *G01L 5/00*  | (2006.01) |
| *G01L 5/24*  | (2006.01) |
| *B65G 11/20* | (2006.01) |
| *F16B 31/02* | (2006.01) |
| *E21D 21/02* | (2006.01) |
| *B02C 17/22* | (2006.01) |
| *E21D 21/00* | (2006.01) |
| *B65G 39/02* | (2006.01) |
| *B02C 17/18* | (2006.01) |

(52) U.S. Cl.
CPC ............ *G01L 5/0019* (2013.01); *B65G 11/20* (2013.01); *E21D 21/02* (2013.01); *F16B 31/025* (2013.01); *F16B 31/028* (2013.01); *G01L 5/0004* (2013.01); *G01L 5/24* (2013.01); *B02C 17/1805* (2013.01); *B02C 17/22* (2013.01); *B02C 2210/01* (2013.01); *B65G 39/02* (2013.01); *B65G 2203/042* (2013.01); *E21D 21/0093* (2013.01)

(58) Field of Classification Search
CPC ......... G01L 5/0019; G01L 5/24; B65G 11/20; B65G 39/02; B65G 2203/042; E21D 21/02; E21D 21/0093; F16B 31/025; F16B 31/028; B02C 17/1805; B02C 17/181; B02C 17/22; B02C 2210/01; G01N 2291/2696; G08B 21/00; F16C 32/00

See application file for complete search history.

(56) References Cited

U.S. PATENT DOCUMENTS

| 6,535,135 | B1  |   | 3/2003  | French et al.           |
| 9,483,674 | B1  | * | 11/2016 | Fink ............... G06K 7/10366 |
| 2003/0030565 | A1 |   | 2/2003 | Sakatani et al.         |
| 2005/0079748 | A1 | * | 4/2005 | Kim ................ H05K 1/0215 |
|           |     |   |         |                  439/92 |
| 2007/0017295 | A1 | * | 1/2007 | Ohta ................... G01L 5/24 |
|           |     |   |         |                  73/761 |

(Continued)

*Primary Examiner* — Suman K Nath
(74) *Attorney, Agent, or Firm* — Shackelford, Bowen, McKinley & Norton, LLP

(57) ABSTRACT

A monitoring system includes a fastener. A sensor is coupled to the fastener. A circuit board is electrically coupled to the sensor. An antenna electrically coupled to the circuit board.

16 Claims, 18 Drawing Sheets

(56) References Cited

U.S. PATENT DOCUMENTS

| | | |
|---|---|---|
| 2011/0137587 A1 | 6/2011 | Rothlisberger et al. |
| 2013/0139604 A1 | 6/2013 | Baroudi et al. |
| 2015/0245164 A1 | 8/2015 | Merrill |
| 2015/0292996 A1* | 10/2015 | Hsieh ................. G01N 3/08 73/761 |

\* cited by examiner

METHOD AND SYSTEM FOR COMPONENT WEAR MONITORING

CROSS-REFERENCE TO RELATED APPLICATIONS

This application is a continuation of U.S. patent application Ser. No. 15/967,932, filed on May 1, 2018. U.S. application Ser. No. 15/967,932 claims priority to U.S. Provisional Patent Application No. 62/492,361, filed on May 1, 2017. U.S. patent application Ser. No. 15/967,932 and U.S. Provisional Patent Application No. 62/492,361 are hereby incorporated by reference.

BACKGROUND

Technical Field

The present disclosure is directed to a method and system for monitoring the forces, temperatures, and movements of fasteners, rollers, and wear surfaces and transmitting that information to a data acquisition system.

Description of the Related Art

In the current art several different methods have been developed in an effort to determine the integrity of a fastener such as, for example, a bolt. In underground roof bolting, for example, the conventional approach for determining bolt integrity is the pull-out test. The pull-out test is a time-consuming and destructive process. Therefore, the necessity to develop non-destructive test methods that can be used to determine the reliability of the rock bolt in-situ is urgent. Developments in sensing materials have provided several potential sensing methods. Piezoelectric materials and fiber-optic sensors are currently two of the most widely adopted sensing techniques. Piezoelectric transducers require proper protection and obtaining signals from sensors can be problematic due to cabling issues. Fiber-optic sensors are useful in monitoring within areas with high electromagnetic interference and high temperatures but may not provide the information provided by piezoelectric sensors.

SUMMARY

In one aspect, the present disclosure relates to a monitoring system. The monitoring system includes a fastener. A sensor is coupled to the fastener. A circuit board is electrically coupled to the sensor. An antenna electrically coupled to the circuit board.

In another aspect, the present disclosure relates to a roller wear sensor. The roller wear sensor includes a bearing assembly. A sensor is disposed with the bearing assembly. An antenna is electrically coupled to the sensor. A power source is electrically coupled to the antenna.

In another aspect, the present disclosure relates to a wear monitoring system. The wear monitoring system includes a plurality of wear pads. A sensor is disposed within the wear pad. An antenna is electrically coupled to the sensor.

DETAILED DESCRIPTION

Figure 1:
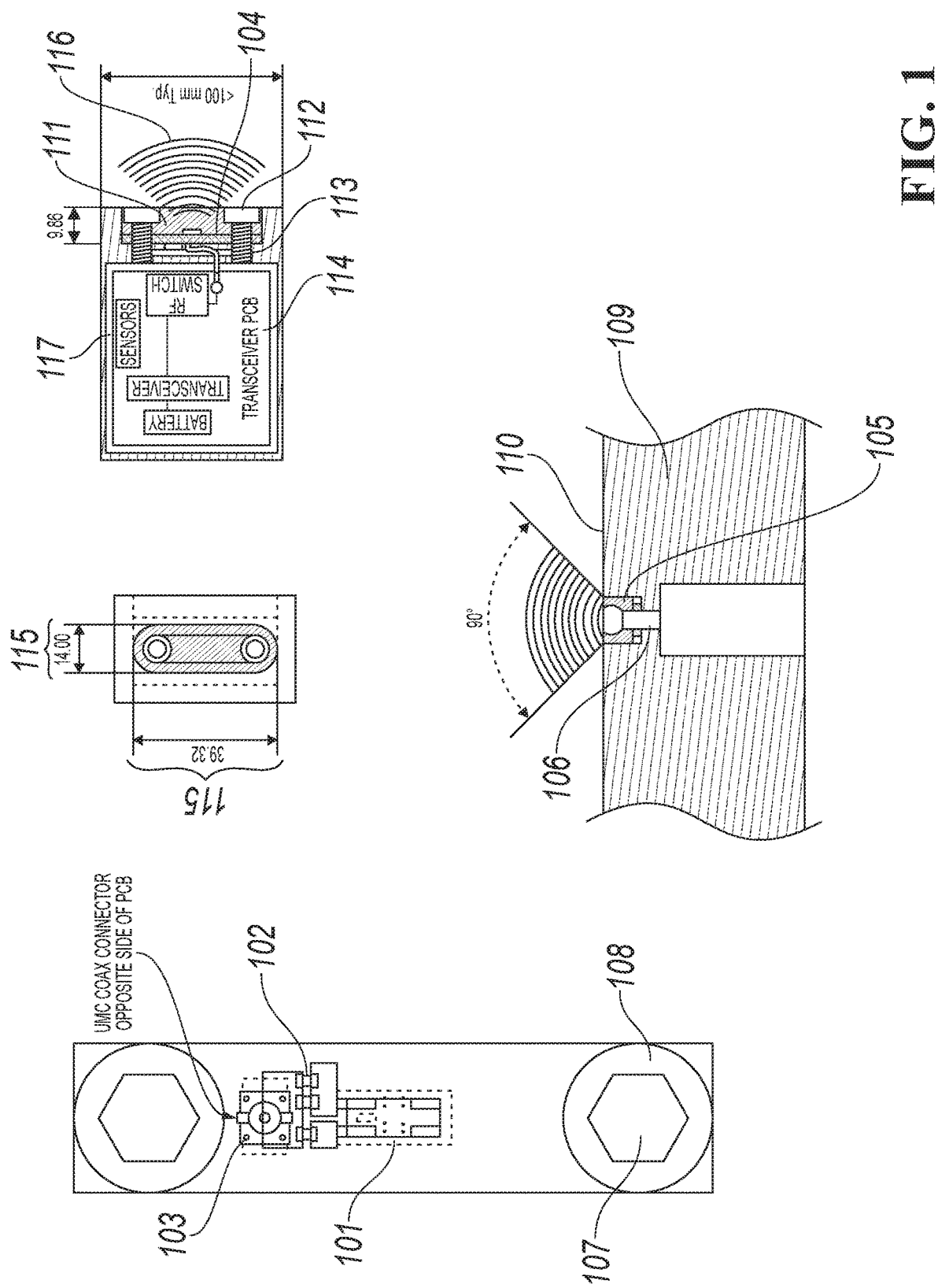
FIG. 1 is a single-sided embodiment of the remote recessed reflector antenna.

An example embodiment of an antenna with recessed reflector is shown in FIG. 1. The antenna 101, series and shunt tuning components 102, and cable connector 103 are mounted on a small circuit board ("PCB") 104 that is positioned in the antenna cavity 105 with two mounting holes 107 aligned with threaded screw holes 106 in the bottom of the antenna cavity 105. The bottom sides of the two screw holes 106 in the circuit board 104 have exposed annular rings 108 that are conductively bonded to a steel surface of the bottom of the cavity 105 using an electrically conductive compound. This conductive joint between the grounded PCB 104 annular rings 108 extends the PCB 104 ground plane into the steel chassis 109. This overall ground plane acts as the reflector for the antenna. The current means of mounting these types of antennas is on the edges of flat corner surface reflectors. Mounting the antenna 101 on flat surface corner reflectors is not possible on flat surfaces because the surfaces 110 are exposed to a harsh environment (the antenna 101 would eventually be destroyed). Recessing the antenna 101 into the surface prevents it from being damaged or scraped off the surface on traveled, wear, or aerodynamic surfaces.

The antenna 101 and the PCB 104 are further protected with a cover 111 formed out of a material (such as PTFE) that fills the cavity 105 in front of the antenna 101 and which is attached by means of two screws 112. Connectors 103 are attached to RF cables 113. RF cables 113 carry signals to and from the transceiver and the processing circuit board 114. Dimensions 115 of the cavity 105 allow the radiation pattern 116 to be modified by altering these dimensions 115, when practical. This set of cavity 105 dimensions 115 is specific to this example and may obviously be altered, as required, for similar embodiments of this disclosure. Recessing the antenna 101 and changing the dimensions of the 115 cavity 105 changes the radiation characteristics from an omnidirectional configuration that is characteristic of radiation reflected off of a horn antenna. These changes will make the antenna 101 beam operate in a directional pattern.

Figure 2A:
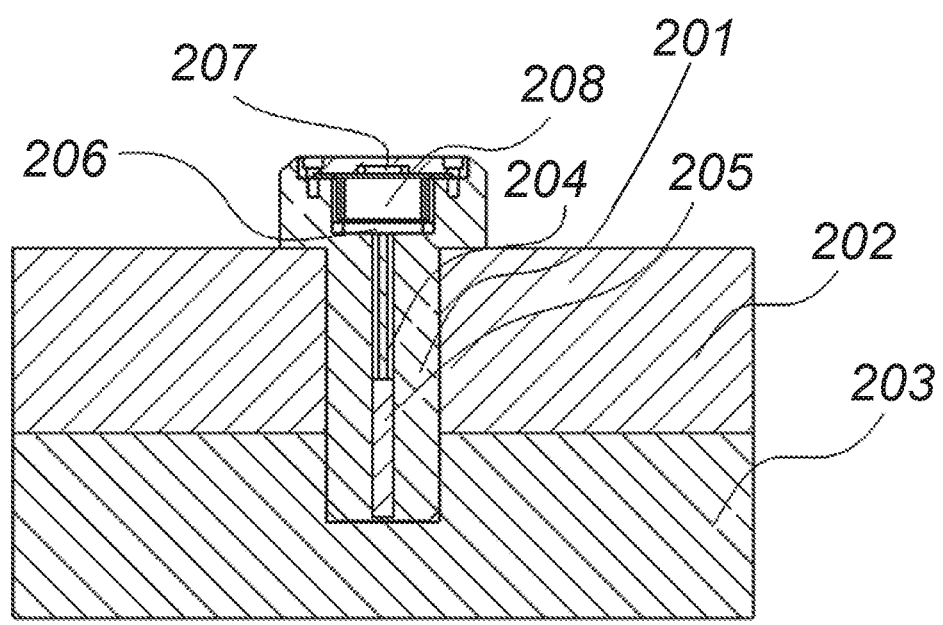
FIG. 2A is a section view of a fastener showing sensors, a processor and a remote recessed reflector antenna embedded therein.
Figure 2B:
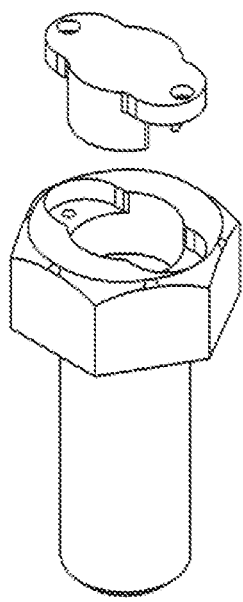
FIG. 2B is an exploded perspective view of the fastener of FIG. 2A.

FIG. 2A is a section view of a fastener 201 such as, for example, a bolt with an embedded monitoring system. The fastener 201 acts as a fastener of a first object 202 to a second object 203. The center of the fastener 201 has a bore 204 containing a tension sensor 205 therein. The tension sensor 205 is in electrical communication with a printed circuit board 206 that has additional sensors thereon. The printed circuit board 206 is in electrical communication with the remote recessed reflector antenna 207 shown in FIG. 1. The electrical components are powered by a battery 208. FIG. 2B is an exploded perspective view of the system shown in FIG. 2A.

Figure 2C:
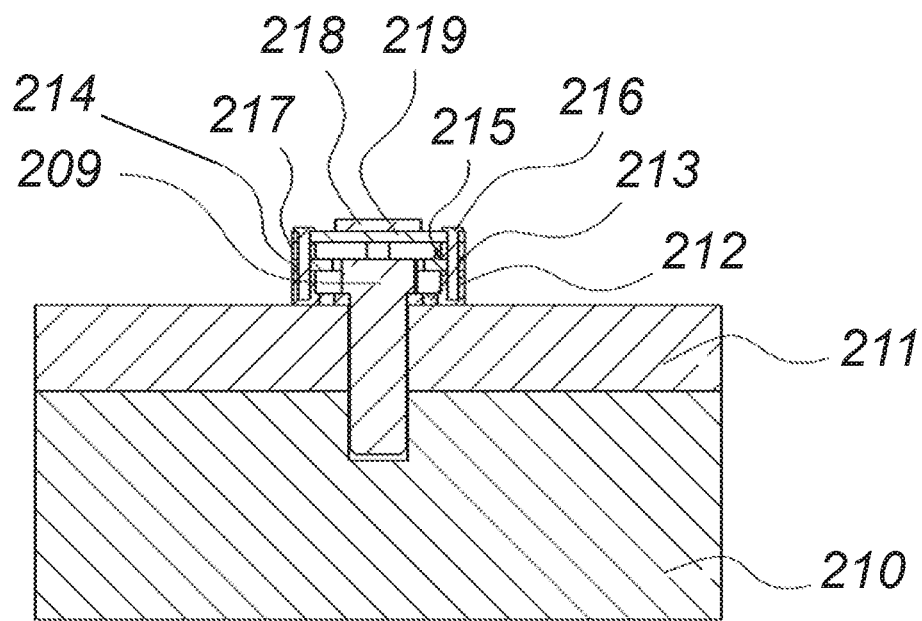
FIG. 2C is a section view of a small diameter fastener showing sensors, a processor and an antenna mounted thereon.
Figure 2D:
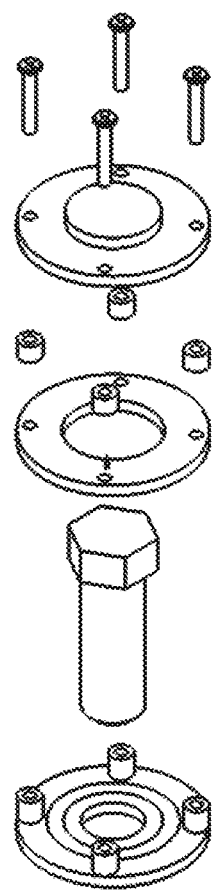
FIG. 2D is an exploded perspective view of the small diameter fastener of FIG. 2C.

FIG. 2C is a section view of a small diameter fastener 209 having a monitoring system mounted thereon. The small diameter fastener 209 is a fastener of a first object 210 and a second object 211. The small diameter fastener 209 has a washer 212 having sensors 213 mounted thereon. The washer 212 is connected to a donut-shaped printed circuit board 214 with antenna 215 via screws 216 that are disposed within spacers 217 such that the head of the fastener 209 has clearance through the center of the donut-shaped printed circuit board 214. The donut-shaped printed circuit board 214 is powered by a battery 218 that is fixed to a battery printed circuit board 219. FIG. 2D is an exploded perspective view of the system shown in FIG. 2C.

Figure 3A:
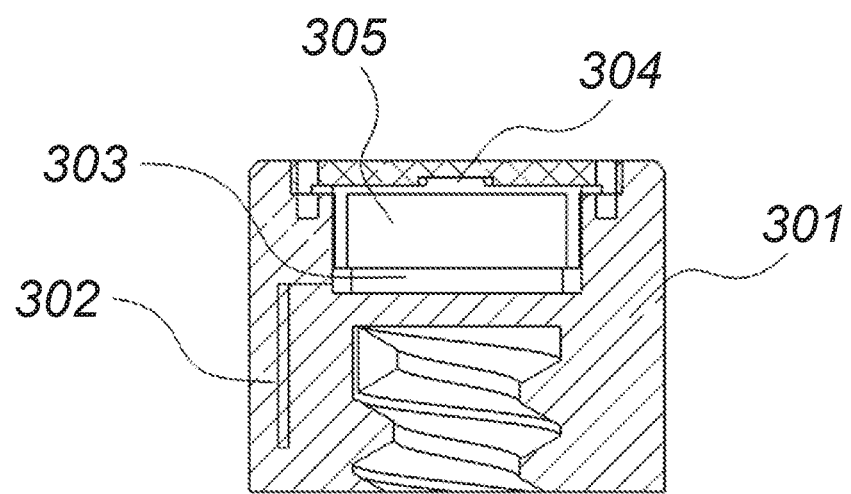
FIG. 3A is a section view of a nut having sensors, a processor and a remote recessed reflector antenna mounted therein.
Figure 3B:
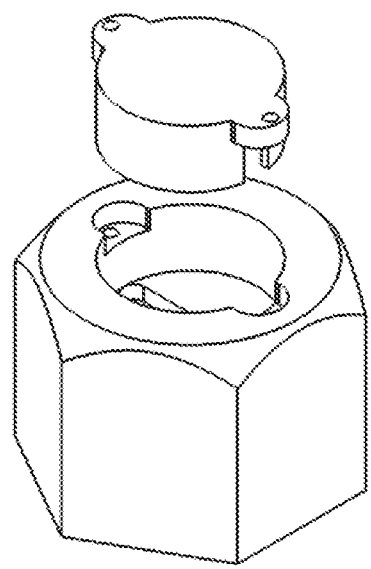
FIG. 3B is an exploded perspective view of the nut of FIG. 3A.

FIG. 3A is a section view of an embedded monitoring system for a nut 301. The nut 301 has an optional embedded strain sensor 302 that is in electrical communication with a printed circuit board 303 with sensors. The strain sensor 302 is only necessary in a load-bearing embodiment of the nut 301. The printed circuit board 303 is in electrical communication with the remote recessed reflector antenna 304 of FIG. 3A. The system of FIG. 3A is powered by a battery 305. FIG. 3B is an exploded perspective view of the system of FIG. 3A.

Figure 4:
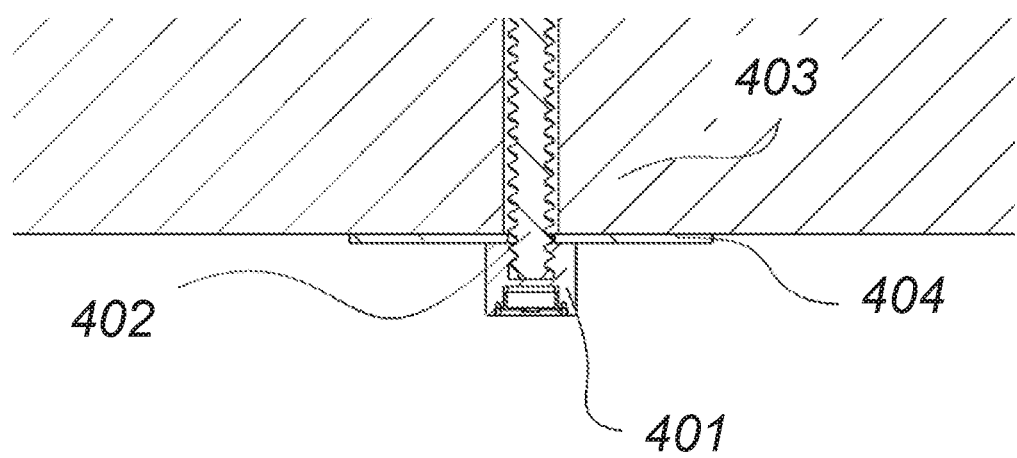
FIG. 4 is a section view of a roof bolt engaged with a load-bearing nut that shows sensors, a processor and a remote recessed reflector antenna mounted therein.

FIG. 4 is a perspective view of a load-bearing embodiment 401 of the system 301 shown in FIGS. 3A-3B. The load-bearing embodiment 401 is attached to a roof bolt 402 to serve as an exemplary application of the load-bearing embodiment 401 of the system 301 in FIGS. 3A-3B. A roof bolt 402 is engaged with strata 403 such that the bolt 402 is in tension when the load-bearing embodiment 401 of the system 301 shown in FIG. 3A is threaded onto the bolt 402 and compressed against the bearing plate 404. Tension in the bolt 402 is related to compression in the load-bearing embodiment 401 of the system 301, which is monitored from the strain sensor 302 shown in FIG. 3A. Vibration may also be monitored by the sensors 117 on the printed circuit board 114. Changes in the characteristics of vibration, such as amplitude and frequency, induced by normal activities such as mining can be used to make inferences about the integrity of the bolt 402.

Figure 5:
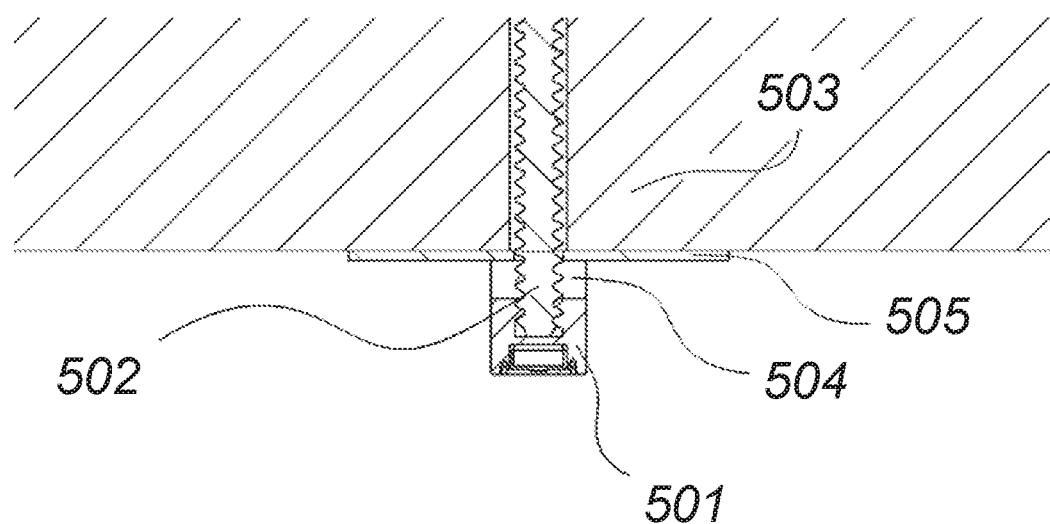
FIG. 5 is a section view of a roof bolt engaged with a passive nut that shows sensors, a processor and a remote recessed reflector antenna mounted therein.

FIG. 5 is a perspective view of a passive embodiment 501 of the system 301 shown in FIGS. 3A-3B. In the present disclosure, "passive" refers to a system that is not load-bearing and has no need for strain sensors 302. A roof bolt 502 is engaged with roof strata 503 such that the bolt 502 is in tension when the conventional nut 504 is threaded onto the bolt 502 and compressed against the bearing plate 505. The passive, monitoring nut is threaded onto the roof bolt 502 after the conventional nut 504 but is not threaded to a point that introduces compression to the passive embodiment 501 of the system 301. Vibration is monitored by the sensors 117 on the printed circuit board 114. Changes in the characteristics of vibration, such as amplitude and frequency, induced by normal activities such as mining can be used to make inferences about the integrity of the bolt 502.

Figure 6:
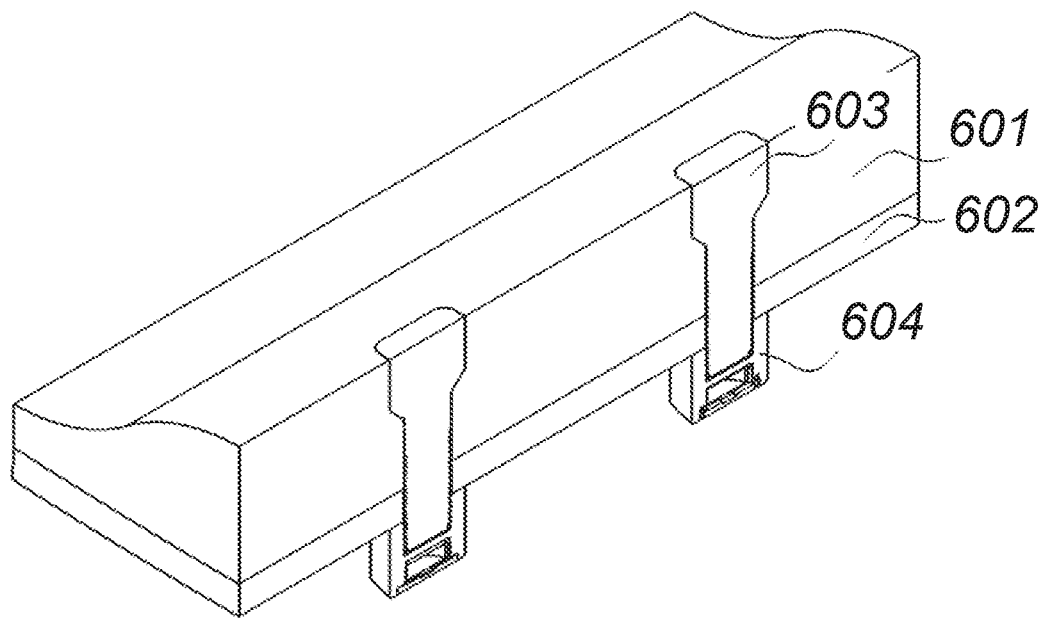
FIG. 6 is a perspective section view of a ball mill liner having mounting bolts engaged with a load-bearing nut that shows sensors, a processor and a remote recessed reflector antenna mounted therein.

FIG. 6 is a perspective view of a ball mill liner module having a liner 601 secured to a mill wall 602 using mounting bolts 603 and a load-bearing embodiment 604 of the system 401. The load-bearing embodiment 604 of the system 301 shown in FIGS. 3A-3B is threaded onto to the mounting bolts 603 and tightened against the outside of the mill wall 602. As the mill liner 601 wears down, so do the mounting bolts 603. Increased wear changes the length of the mounting bolts 603 which changes resonant frequency of the mounting bolt. Vibration induced by normal mill operation excites vibration in the mounting bolts 603 so the frequency of vibration can be monitored by the sensors in the system 604 and wear can be inferred from this information. The strain sensor 302 may also be used to monitor liner module integrity and infer wear. For example, if strain readings suddenly drop and remain at the decreased reading for a period of time, it may be inferred that there is a loose component in the mill liner module.

Figure 7:
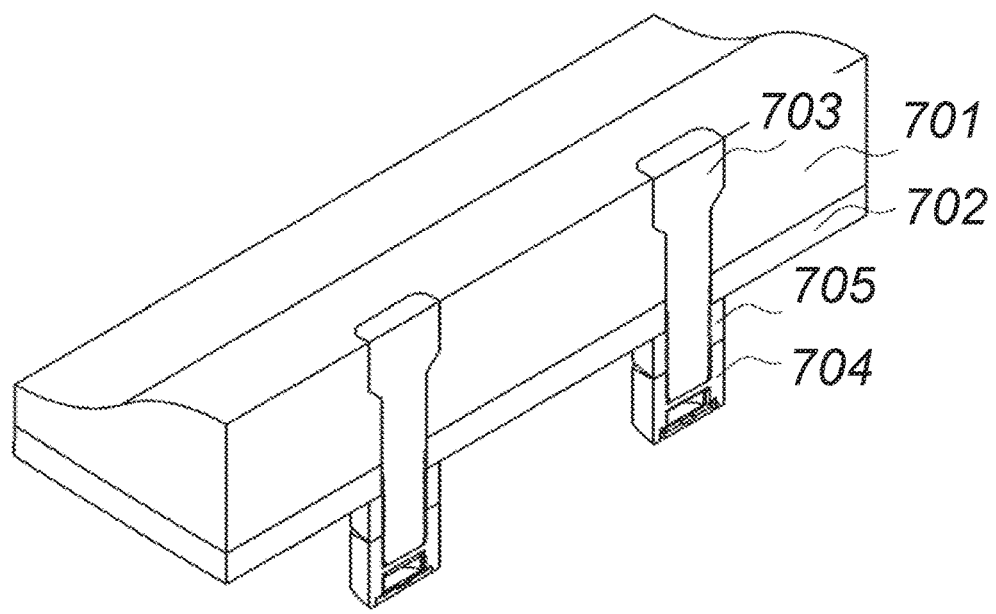
FIG. 7 is an exploded perspective view of a ball mill liner having mounting bolts engaged with a passive nut that shows sensors, a processor and a remote recessed reflector antenna mounted therein.

FIG. 7 is an exploded perspective view of a ball mill liner module having a liner 701 secured to a mill wall 702 using mounting bolts 703 and mounting nuts 705. The passive embodiment 704 of the system 301 shown in FIGS. 3A-3B is threaded to the mounting bolts 703 over the mounting nuts 705 outside of the mill wall 702. As the mill liner 701 wears down, so do the mounting bolts 703. Increased wear changes the length of the mounting bolts 703, which changes resonant frequency of the mounting bolt. Vibration induced by normal mill operation excites vibration in the mounting bolts 703 so the frequency of vibration can be monitored by the sensors in the passive embodiment 704 of the system 301 shown in FIG. 3A and wear can be inferred from this information.

Figure 8:
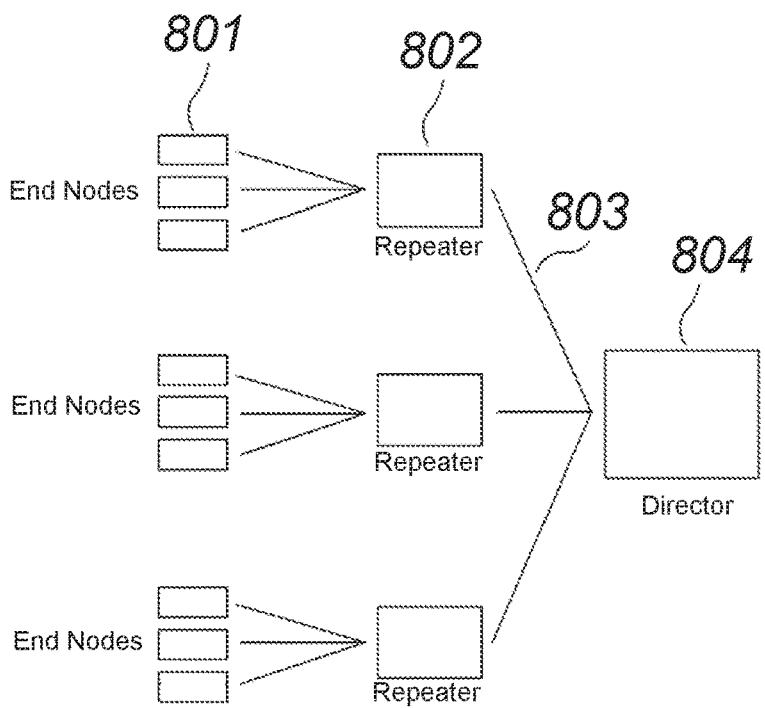
FIG. 8 is a flow chart of a typical mesh network topology.

FIG. 8 shows basic network topology for a wireless networks. In the topology, end nodes 801 transmit signals 803 to and receive signals 803 from repeaters 802. Repeaters 802 transmit signals 803 to and receive signals 803 from the director 804. In a typical embodiment, directors 804 control the signal 803 paths between all of the devices in the network. Repeaters 802 receive signals 803 from devices and replicate them to other devices; and end nodes 801 send to and receive signals 803 from repeaters 802 or directors 804.

Figure 9:
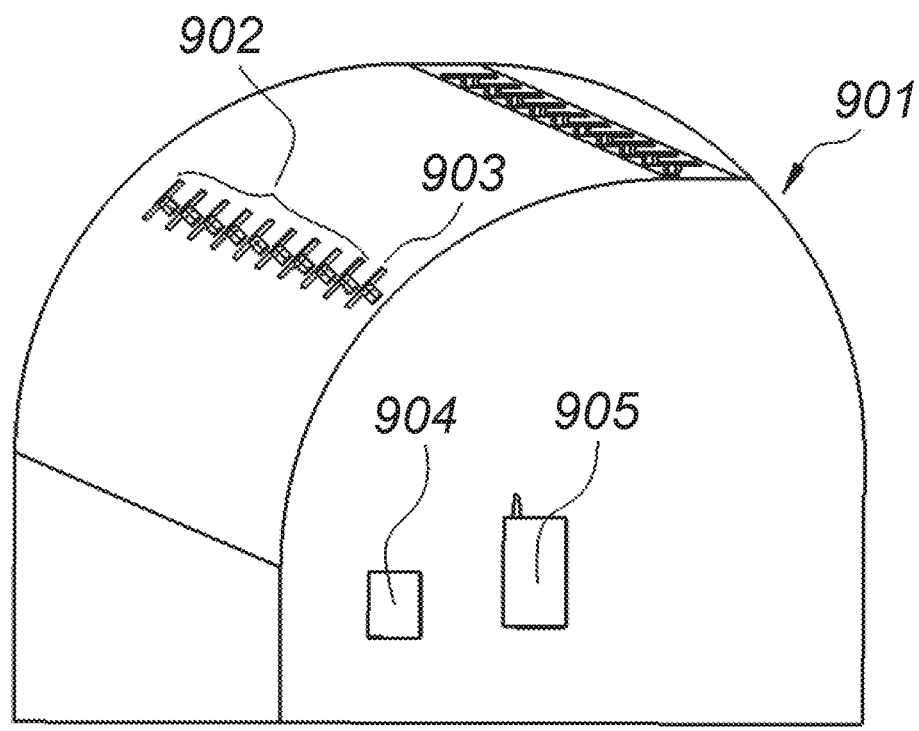
FIG. 9 is a perspective view of a plurality of wireless bolt monitoring systems in mesh network communication.

FIG. 9 is a perspective view of a bolt monitoring system using mesh network communication. For the purposes of this patent application, FIG. 9 represents, for example, development in an underground mine 901. Most of the units of a roof bolt monitoring system act as end nodes 902 in a mesh network. The information they gather is transmitted wirelessly using the remote recessed reflector antenna of FIG. 1 to a messenger unit 903. There may be one messenger unit 903 per several end nodes 902. The messenger node stores the information it has received and identifies which end node 902 the information was transmitted from. Periodically, the messenger node 903 wirelessly uploads the stored information to a wireless data acquisition unit 904 that may be mobile or stationary. The wireless data acquisition unit 904 may be powered by battery or may be attached to and powered by mobile mine equipment. All of the information collected from the wireless data acquisition unit 904 is finally uploaded to a central data acquisition system 905 where information from all the end nodes 902 can be accessed. The end nodes 902 are analogous to the end nodes 801 in FIG. 8. The messenger units 903 are analogous to the repeaters in FIG. 8. The data acquisition systems 904 and 905 are analogous to the directors 804 in FIG. 8.

Figure 10:
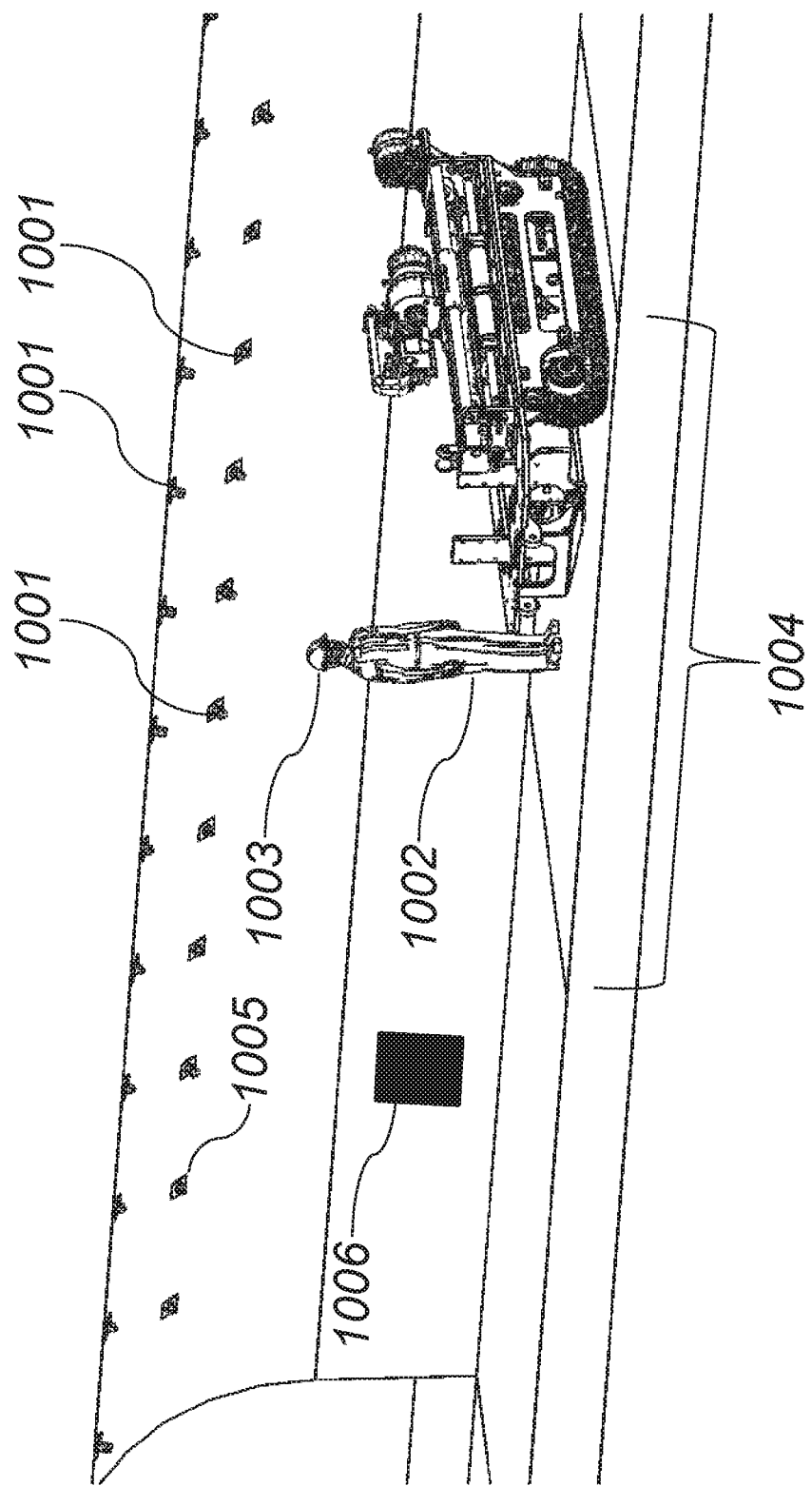
FIG. 10 is a perspective view of a roof bolt monitoring system with personnel integration.

The bolt monitoring system of FIG. 9 may be integrated with wearable communications technology, as illustrated in FIG. 10. In this embodiment, the end nodes 1001 may transmit information to personnel 1002 having wearable wireless communications technology 1003. The information transmitted may include, for example, information about the integrity of the roof in a working area 1104. In this example, movement of the roof may be detected by the end nodes 1001. The end nodes then transmit to the wearable wireless communications system on personnel in the working area. This may be accomplished by direct communication between the end nodes 1001 and wearable system 1003 or by communication between the end nodes 1001 and wearable system via a messenger unit 1005. The wearable system 1003 is able to alert the personnel 1002 in the area that working conditions are unsafe. The wearable system 1003 is also able to transmit to the end nodes 1001, which may be used as a mesh network to relay the information throughout and outside the underground mine, to the messenger unit 1005, or directly to the data acquisition unit 1006.

Figure 11A:
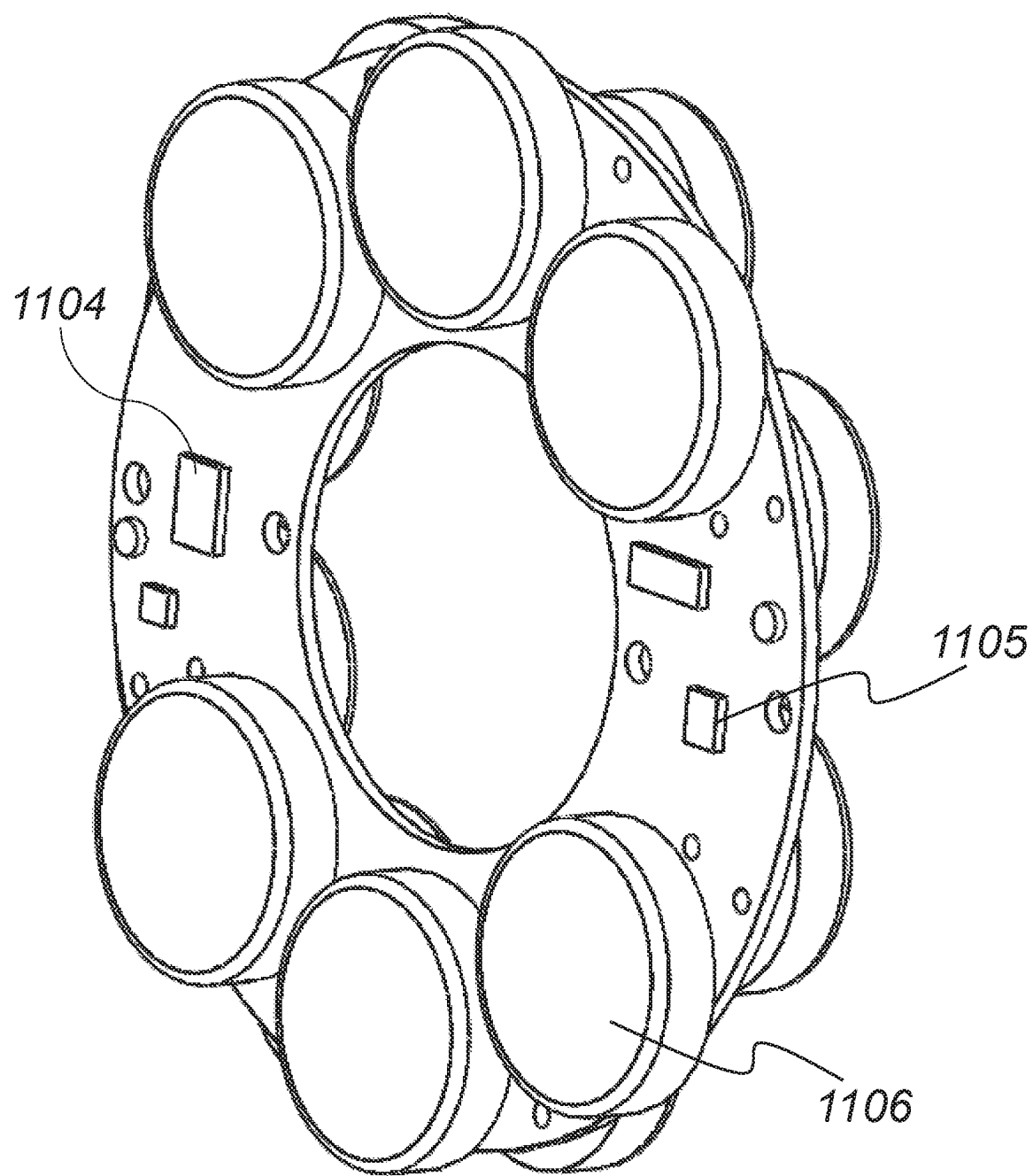
FIG. 11A is a perspective view of the electronics of a roller condition monitoring system.
Figure 11B:
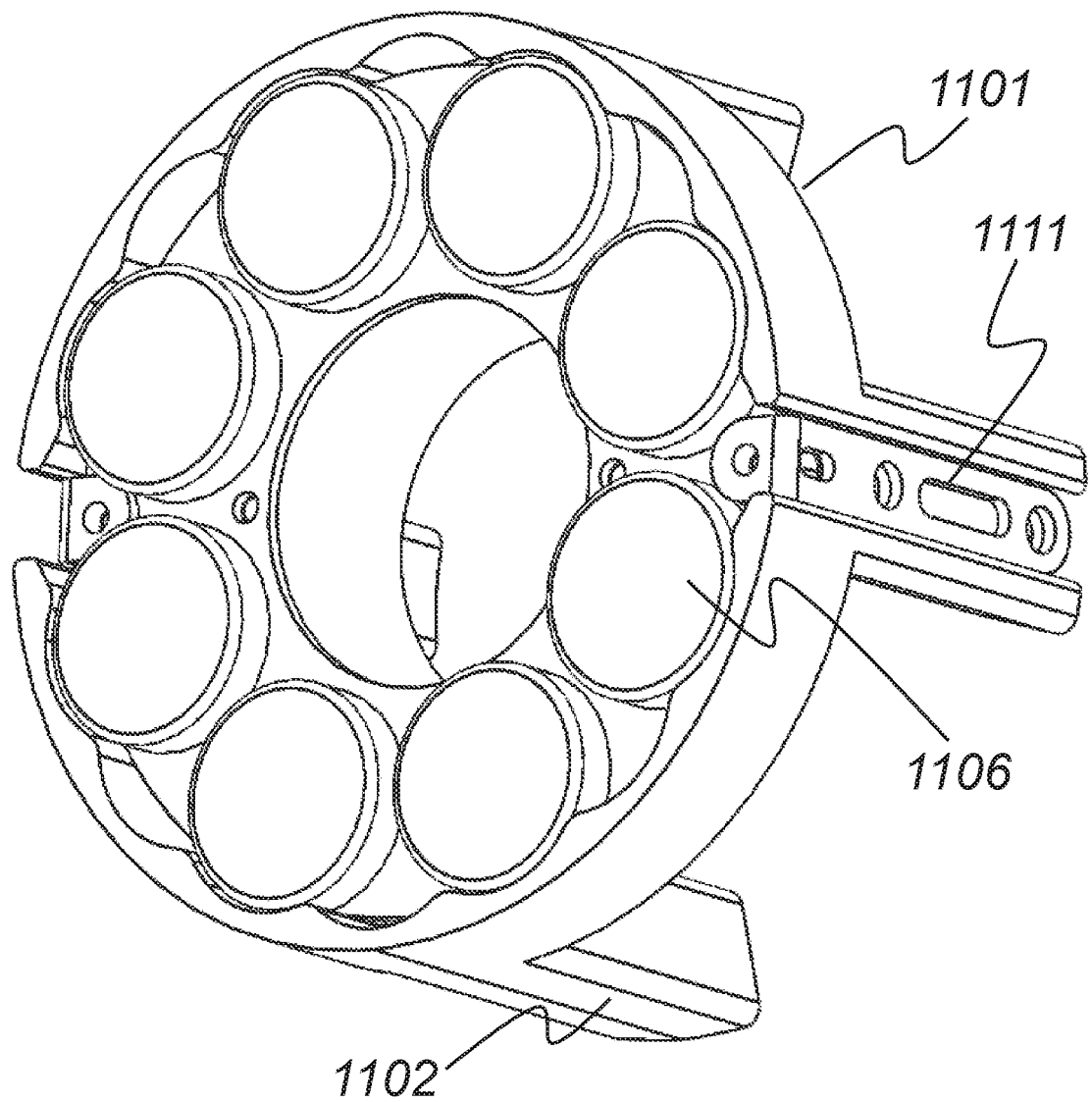
FIG. 11B is a perspective view of the electronics of a roller condition monitoring system disposed in a housing.
Figure 11C:
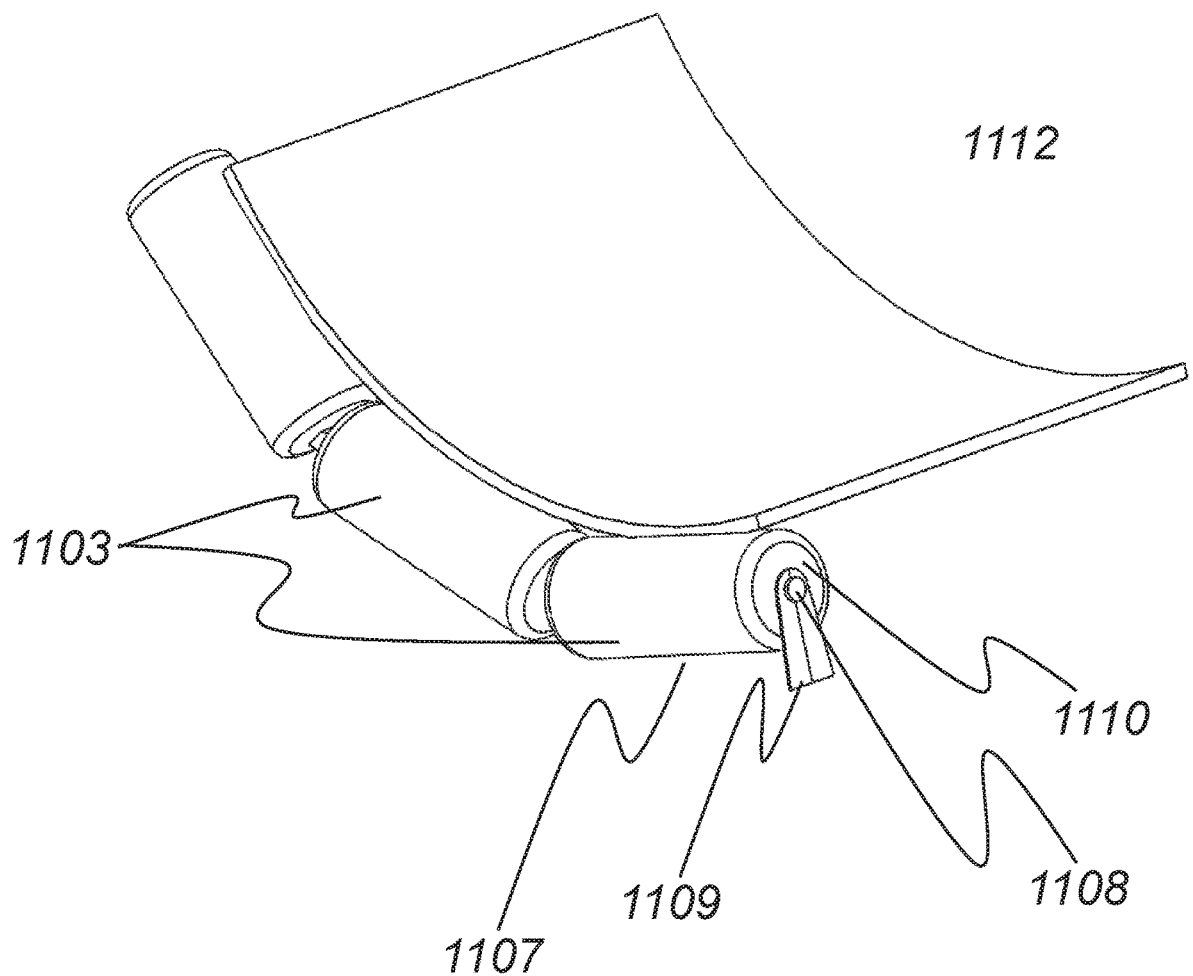
FIG. 11C is a perspective view of a conveyor roller trough.

FIGS. 11A-11C illustrate a system for monitoring the condition of conveyor rollers. The roller condition monitor 1101 may include an embedded assembly which is mounted on a molded frame 1102 and attached to the inside of one end of a conveyor belt 1112, idler roller 1113, or a modular assembly that may be inserted and removed from the roller 1103. FIG. 11A shows the printed circuit board with its components installed. FIG. 11B shows the circuit board assembly installed in the molded frame 1102. FIG. 11C shows a roller set with the conveyor belt 1112. The monitor 1101 uses a thermal sensor that is built into the communication processor 1104 and a 3-axis accelerometer/gyro 1105 to track: temperature, 3-axis acceleration and gyration of the roller. Monitored parameters are time stamped and passed to a centralized computer through a network. The monitor is powered by batteries 1106.

Temperature monitoring is used to detect component wear. The ambient temperature is determined by cross-correlating the readings from all temperatures of rollers 1103 in the nearby vicinity. When the temperature of a roller 1103 increases with respect to the ambient temperatures of its neighboring rollers 1103, the increase may be attributed to a failing mechanical component such as a seized bearing, jammed drum, bent roller barrel 1107 or shaft 1108 or any other failed part. Roller friction related failures are a common cause of fires in conveyor systems.

Vibrations monitoring is also used to detect failing mechanical roller parts 1103. As parts wear, they begin to loosen and vibrate different from new parts. Increased vibrations are an indication of roller 1103 damage or wear.

Monitoring gyration rates of rollers 1103 with respect to other rollers 1103 in the vicinity will help detect rollers 1103 that are turning slower than the belt speed. Ideally, all rollers 1103 will rotate at the speed of the belt. When bearings seize, barrels 1107 jam against structural components 1109, ends fail 1110, shafts 1108 bend, or other faults occur, rollers 1103 may be stalled, thus dragging against the conveyor belt 1112.

Parameters that are monitored inside the roller 1103 are stored in in the communication processor 1104. At predetermined intervals, parameters are organized into data packets and transmitted out of the end of the roller 1103 through chip or printed circuit antennas 1111. One or more antennas 1111 may be used for this communication. The use of multiple antennas 1111 allows multiple wireless radio energy paths to transmit around blockages. Rollers 1103 that employ metal ends pass the radio signal through a slot using a recessed reflector antenna 1111 configuration. Rollers that employ non-metal ends may utilize either a level surface mount or a recessed reflector antenna 1111 configuration. The use of two or more antennas 1111 may aide in keeping the rollers 1103 balanced, thus increasing the life of the system.

Communications from rollers 1103 may be passed directly to network repeaters or to be passed through mesh networks of rollers 1103 to a common repeater or to the final destination.

Figure 12:
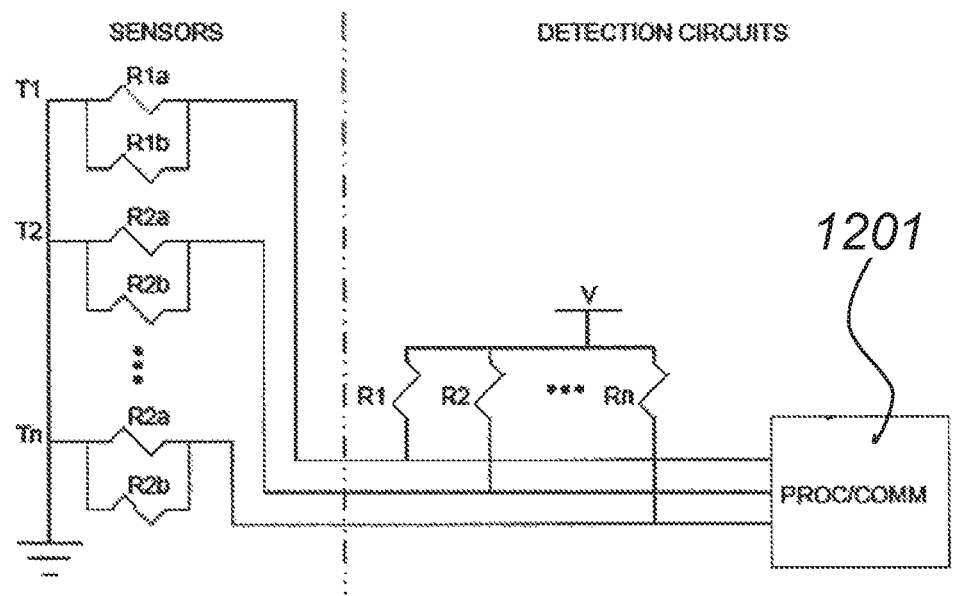
FIG. 12 is a schematic of a redundant resistor wear ladder circuit.

FIG. 12 is a circuit diagram of a wear detector according to an exemplary embodiment. Although the present disclosure is not limited to a specific type of transducer, the use of resistor pairs (redundant resistors) for monitoring is discussed herein as an example. A first resistor pair T1, having resistors R1a and R1b, is embedded nearest the outer wear surface with a second resistor pair T2, having resistors R2a and R2b, through resistor pair Tn equally spaced along the wear path. The resistor pair Tn is located closest to the wear limit. When a wear surface wears down to a resistor pair, such as R1a and R1b, a combinatorial resistance changes. The resistance can be reduced or shorted (if filled with mud) or increased or open (if the connections or resistor are damaged or broken). The change in resistance indicates to a processing device 901 that a wear depth corresponding to a particular resistor pair has been reached. Although not shown in FIG. 12, circuit traces may also be made redundant by use of more traces and circuit board layers to decrease the probability of false indications due to faulty trace failures.

Redundant transducers and traces improve the monitoring reliability of the wear detector. Single component, connection or trace failures resulting from defects in manufacturing, extremes in temperature, shock or vibration of the operating environment are detected and compensated for in the processing circuitry of the processing device 1201. For example, if the parallel combination of the resistors R1a and R1b equals the value of the resistor R1, then the analog voltage detected at the processing device 1201 is V/2. If a failure of the resistor R1a, the resistor R1b, or a connection or trace path to either of these resistors results, due to a manufacturing fault, temperature extremes, or from shock or vibration, one of the resistors R1a or R1b will be omitted from the circuit. Omission of one of the resistors R1a or R1b will result in the resistance of the resistor R1 being ½ the resistance of the remaining connected resistor (R1a or R1b). The voltage detected at the processing device 1201 will then be V/3. This voltage level will indicate to the processing device 1201 that the failure may not be related to wear. If the voltage level is due to wear, it will not make a difference as the other resistor R1*a* or R1*b* will soon be removed by wear. Until both the resistors R1*a* and R1*b* in the pair are faulted, the wear-point will not be considered, by the processing device 1201, to have been reached. In wear detectors that do not have redundancy, failures in any of the traces or transducer will incorrectly indicate that a wear point was reached. This is an example of direct wear monitoring.

Figure 13A:
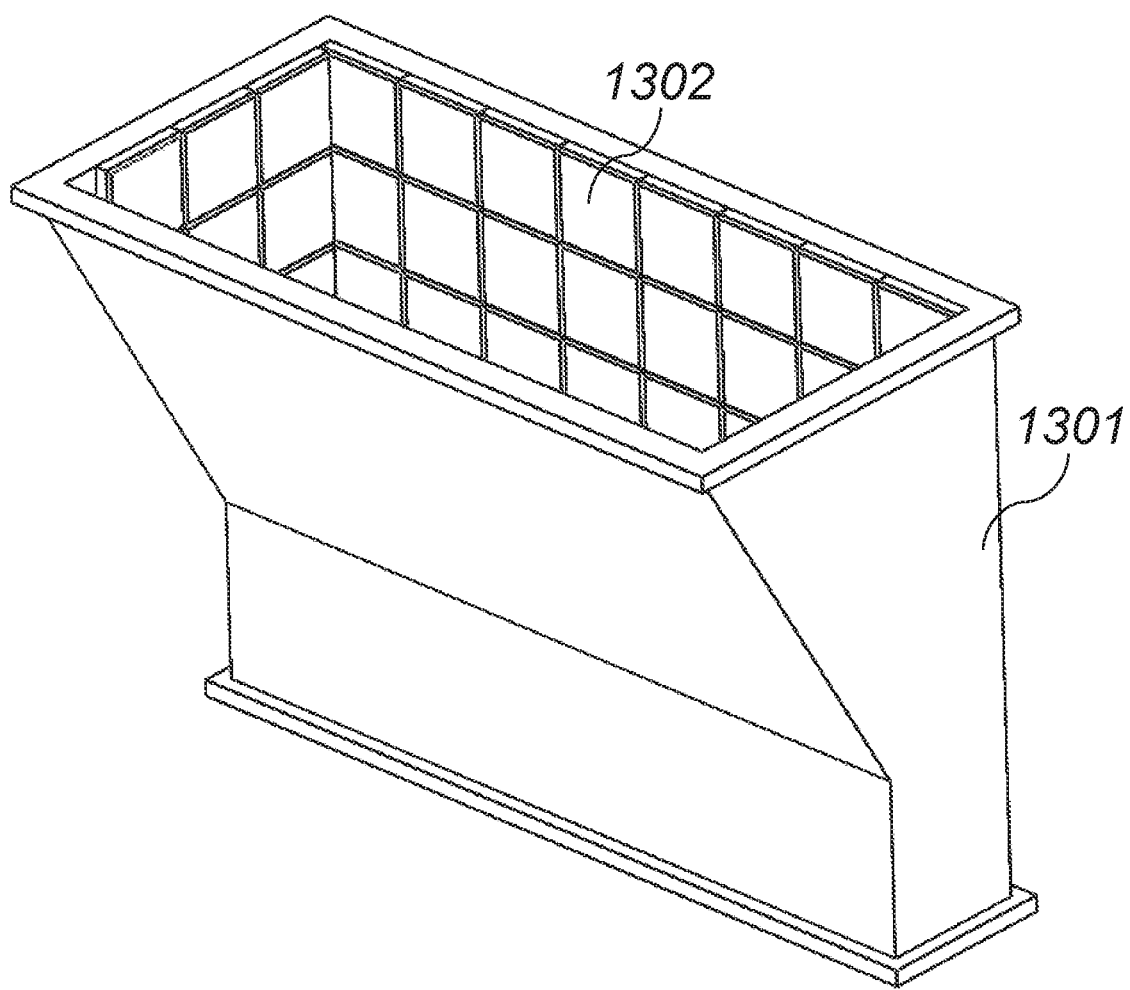
FIG. 13A is a perspective view of a conveyor chute.
Figure 13B:
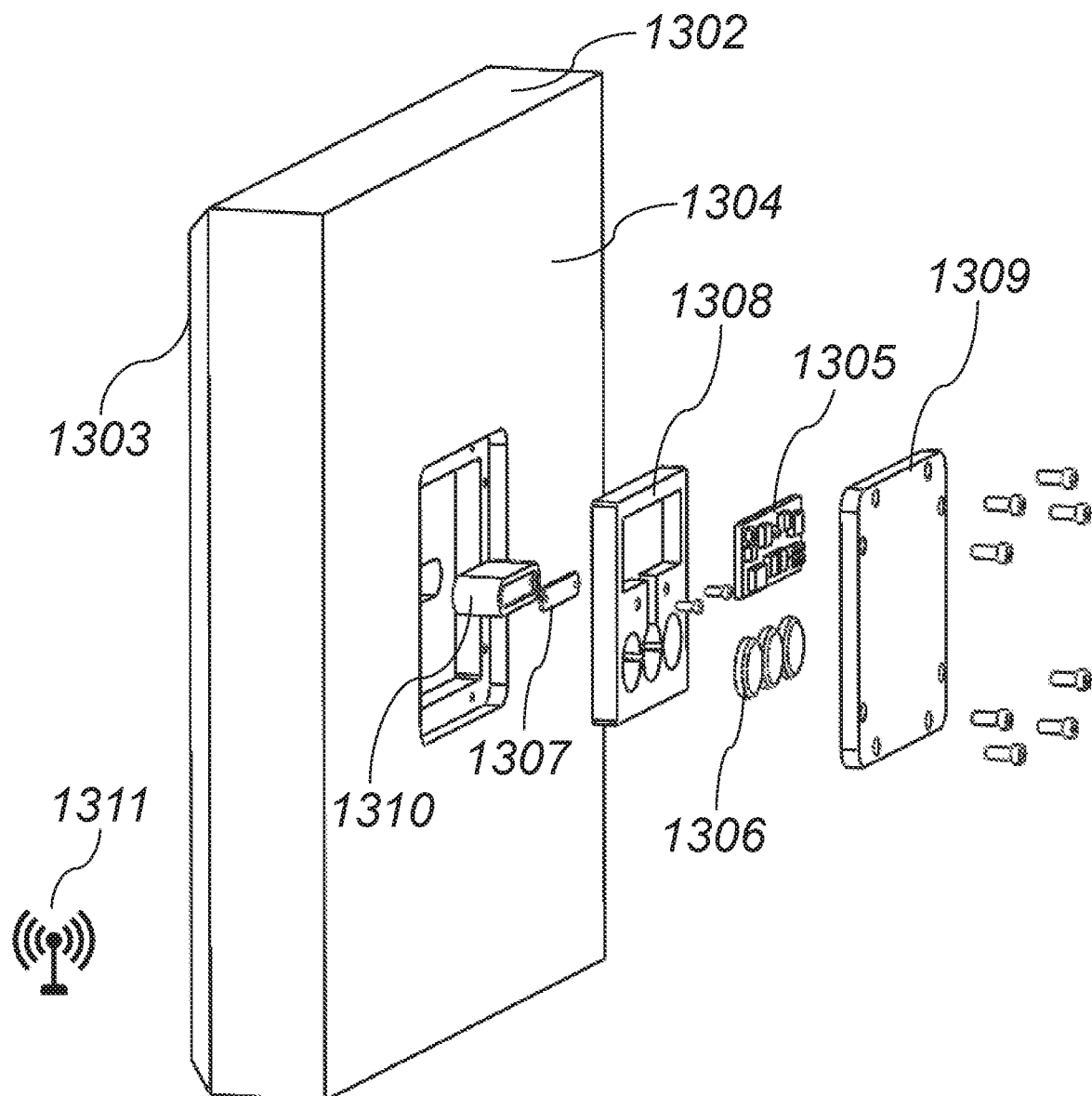
FIG. 13B is an exploded perspective view of a conveyor pad wear monitoring system.
Figure 13C:
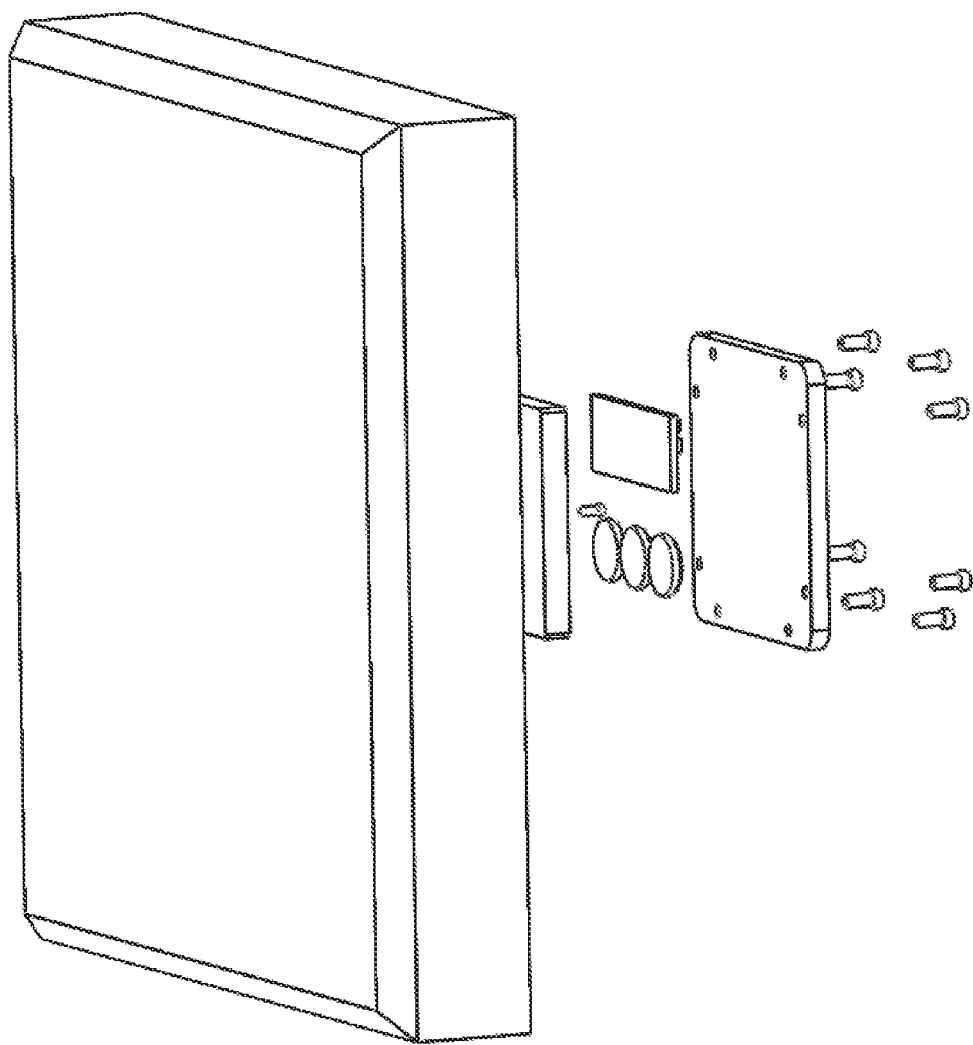
FIG. 13C is an alternative exploded perspective view of a conveyor pad wear monitoring system.

A conveyor chute wear monitoring system is shown in FIG. 13A and includes a conveyor chute 1301 with any number of wear pads 1302. One embodiment of the chute liner monitoring system is shown as a wear pad module in the exploded assembly view of FIG. 13B. In this embodiment, a wear pad 1302 having a wear surface 1303 and mounting surface 1304 may have a printed circuit board ("PCB") 1305, batteries 1306 and radio frequency ("RF") antenna 1307 disposed within. The PCB 1305 is electrically connected to the RF antenna 1307. The PCB 1305 and RF antenna 1307 are powered by any number of batteries 1306. The PCB 1305 may be disposed in a housing 1308 that is disposed in the wear pad 1302 and protected by a cover plate 1309. The RF antenna 1307 may be recessed into the mounting surface 1303 of the wear pad 1302 along with a cover 1310 that is made of a material that allows transmission of RF signal to pass through the cover 1310. As material is passed through the conveyor chute, the wear pads 1302 decrease in thickness from the wear surface 1303. When the end of the wear pad life has been reached, the wearing process will have exposed the cover 1310, allowing transmission of the RF antenna 1307 signal from the wear surface 1303. Reception of the signal by a receiving antenna 1311 indicates that the end of the wear pad life. FIG. 13C is an alternative exploded view of the system of FIG. 13B.

Figure 13D:
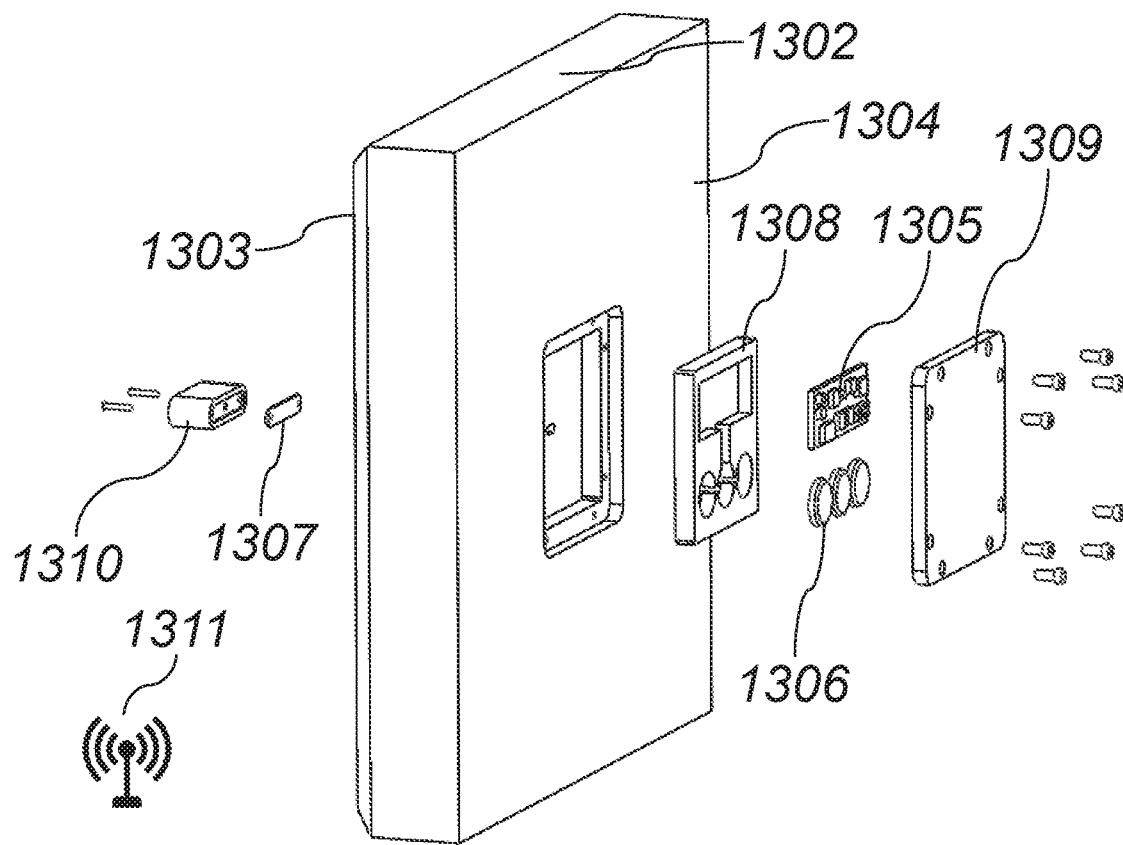
FIG. 13D is an exploded perspective view of an alternative conveyor pad wear monitoring system.
Figure 13E:
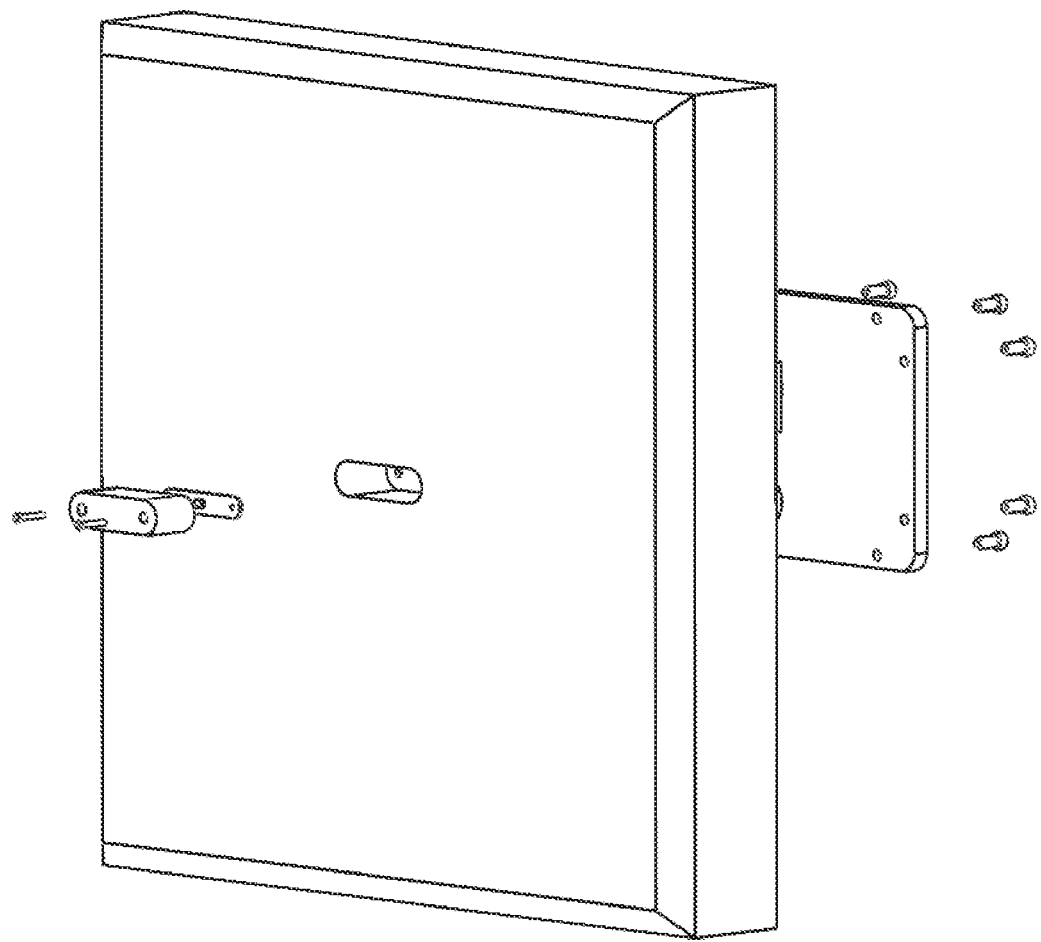
FIG. 13E is an alternative exploded perspective view of an alternative conveyor pad wear monitoring system.

FIG. 13D is a wear life monitor using the redundant resistor wear ladder of FIG. 12 embedded in the cover or wear pad 1302. In this embodiment, the RF antenna 1307 is able to transmit from the wear surface 1303 throughout the entire life of the wear pad 1302. In this embodiment, the RF antenna 1307 is recessed into the wear surface 1303 and protected by a cover 1310 that is made of a material that allows transmission of RF signal to pass through the cover 1310. A PCB 1305, batteries 1306 and housing 1308 are embedded into the mounting surface 1304 of the wear pad and protected by a cover plate 1309. The redundant resistor wear ladder is electrically coupled to the PCB 1305. As the wear pad 1302 decreases in thickness over the wear pad life, the electrical properties of the wear ladder circuit are altered, indicating a certain amount of wear on the wear pad. This information is processed by the PCB 1305 and transmitted to a receiving antenna 1311 from the RF antenna 1307. FIG. 13E is an alternative view of the system shown in FIG. 13D.

Depending on the embodiment, certain acts, events, or functions of any of the methods or processes described herein can be performed in a different sequence, can be added, merged, or left out altogether (e.g., not all described acts or events are necessary for the practice of the methods or processes). Moreover, in certain embodiments, acts or events can be performed concurrently.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A monitoring system, comprising:
   a fastener;
   a sensor embedded in the fastener;
   a circuit board conductively bonded to a bottom of a steel cavity in a chassis of the fastener and electrically coupled to the sensor, the conductively bonded circuit board extending a ground plane of the circuit board into the chassis; and
   an antenna electrically coupled to the circuit board and recessed in the steel cavity such that most of a depth of the steel cavity is in front of the antenna, the extended ground plane of the circuit board acting as a reflector for the antenna.

2. The monitoring system of claim 1, wherein the antenna is mounted on the circuit board.

3. The monitoring system of claim 2, comprising a plurality of sensors coupled to the fastener, wherein the circuit board is electrically coupled to the plurality of sensors.

4. The monitoring system of claim 1, wherein the circuit board comprises an annular ring that is conductively bonded to the bottom of the steel cavity.

5. The monitoring system of claim 1, comprising a cover that at least partially fills a portion of the steel cavity that is in front of the antenna.

6. The monitoring system of claim 1, wherein the fastener is a bolt.

7. The monitoring system of claim 1, wherein the fastener is a nut.

8. The monitoring system of claim 1, wherein the cover comprises polytetrafluoroethylene (PTFE).

9. The monitoring system of claim 1, wherein:
   the fastener has defined therein a bore; and
   the sensor is disposed in the bore.

10. The monitoring system of claim 1, wherein the fastener comprises a washer.

11. The monitoring system of claim 10, wherein the circuit board and the sensor are coupled to the washer.

12. The monitoring system of claim 1, wherein the sensor detects at least one of the following: tension, strain, and vibration.

13. The monitoring system of claim 1, wherein the antenna is in communication with a wearable device.

14. The monitoring system of claim 1, wherein the sensor is at least one of the following: a vibration sensor, a temperature sensor, an accelerometer, and a strain gauge.

15. The monitoring system of claim 1, wherein dimensions of the steel cavity cause the antenna to operate in a directional pattern.

16. The monitoring system of claim 1, wherein the fastener is a roof bolt.

\* \* \* \* \*